(12) United States Patent
Bregman et al.

(10) Patent No.: US 11,861,376 B2
(45) Date of Patent: Jan. 2, 2024

(54) LIVE EDIT OF CONFIGURATION MANAGEMENT EXECUTION

(71) Applicant: Red Hat, Inc., Raleigh, NC (US)

(72) Inventors: Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 145 days.

(21) Appl. No.: 17/584,935

(22) Filed: Jan. 26, 2022

(65) Prior Publication Data
US 2023/0236845 A1    Jul. 27, 2023

(51) Int. Cl.
G06F 9/00 (2006.01)
G06F 9/445 (2018.01)
G06F 9/48 (2006.01)
G06F 11/22 (2006.01)

(52) U.S. Cl.
CPC .......... *G06F 9/44505* (2013.01); *G06F 9/485* (2013.01); *G06F 9/4881* (2013.01); *G06F 11/2289* (2013.01)

(58) Field of Classification Search
CPC .... G06F 9/44505; G06F 9/485; G06F 9/4881; G06F 9/5077; G06F 11/2289
See application file for complete search history.

(56) References Cited

U.S. PATENT DOCUMENTS

| | | | |
|---|---|---|---|
| 7,890,927 B2 | 2/2011 | Eldridge et al. | |
| 8,239,498 B2 | 8/2012 | Kilpatrick et al. | |
| 9,032,368 B2 | 5/2015 | Polakam et al. | |
| 10,268,468 B2 | 4/2019 | Naqvi | |
| 10,474,559 B2 | 11/2019 | Moorthi et al. | |
| 11,089,474 B2 | 8/2021 | Maheshwari et al. | |
| 2003/0212983 A1* | 11/2003 | Tinker | G06F 8/65 717/110 |
| 2005/0034109 A1 | 2/2005 | Hamilton et al. | |
| 2019/0028332 A1* | 1/2019 | Ding | H04L 41/0869 |

OTHER PUBLICATIONS

"System and Method for Setting Breakpoints when Debugging Ansible Playbook Tasks ED—Dari Kuhn", ip.com, ip.com Inc., West Henrietta, NY, US, Oct. 11, 2021 (Oct. 11, 2021), XP013191285, 5 pages.
Extended European Seach Report for Application No. 22168374.1, dated Sep. 9, 2022, 8 pages.
"Dynamically Modifying an Application", Oracle, accessed Dec. 10, 2021, 26 pages https://docs.oracle.com/cd/E35855_01/tuxedo/docs12c/ada/addynr.html.
"Managing Configuration Changes", BEA Systems, accessed Dec. 10, 2021, 4 pages https://docs.oracle.com/cd/E11035_01/wls100/domain_config/changes.html.

* cited by examiner

*Primary Examiner* — Nitin C Patel
(74) *Attorney, Agent, or Firm* — Lowenstein Sandler LLP

(57) ABSTRACT

Systems and methods for configuration file editing during the execution of the configuration process can include initiating a configuration process using a configuration file referencing a sequence of tasks and receiving a command to edit the configuration file. They can also include, responsive to the receipt of the command, pausing the configuration process and modifying one or more tasks in the sequence of tasks to generate a modified configuration file. They can further include resuming the configuration process using the modified configuration file from a point at which the execution was paused.

20 Claims, 6 Drawing Sheets

LIVE EDIT OF CONFIGURATION MANAGEMENT EXECUTION

TECHNICAL FIELD

The disclosure is generally related to computer systems, and more particularly, to editing a configuration file while it is being executed.

BACKGROUND

A computer system, such as a physical server, a virtual machine running on a physical server, or a distributed system of physical and virtual machines, may run multiple applications. Each of those applications, as well as the underlying operating system and hardware, may have numerous configurations and configuration parameters designed to affect various aspects of the hardware, operating system, and/or application performance. The configurations and their respective parameters may be established by configurations processes executed and controlled either locally or remotely from the subject computer system. Configuration management is a systems engineering process for establishing and maintaining the performance, function, and physical attributes of a system consistent with the system's and its user's requirements, design, and operation goals throughout the lifetime of the system. Configuration management tools, such as configuration management software (i.e., configuration managers), provide information technology engines that support provisioning, configuration management, orchestration, and application deployment in localized and distributed systems. Configuration managers are able to set configurations, deploy software, control changes in hardware and software deployed, as well as monitor and control the processes that perform these functions in localized and distributed system.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
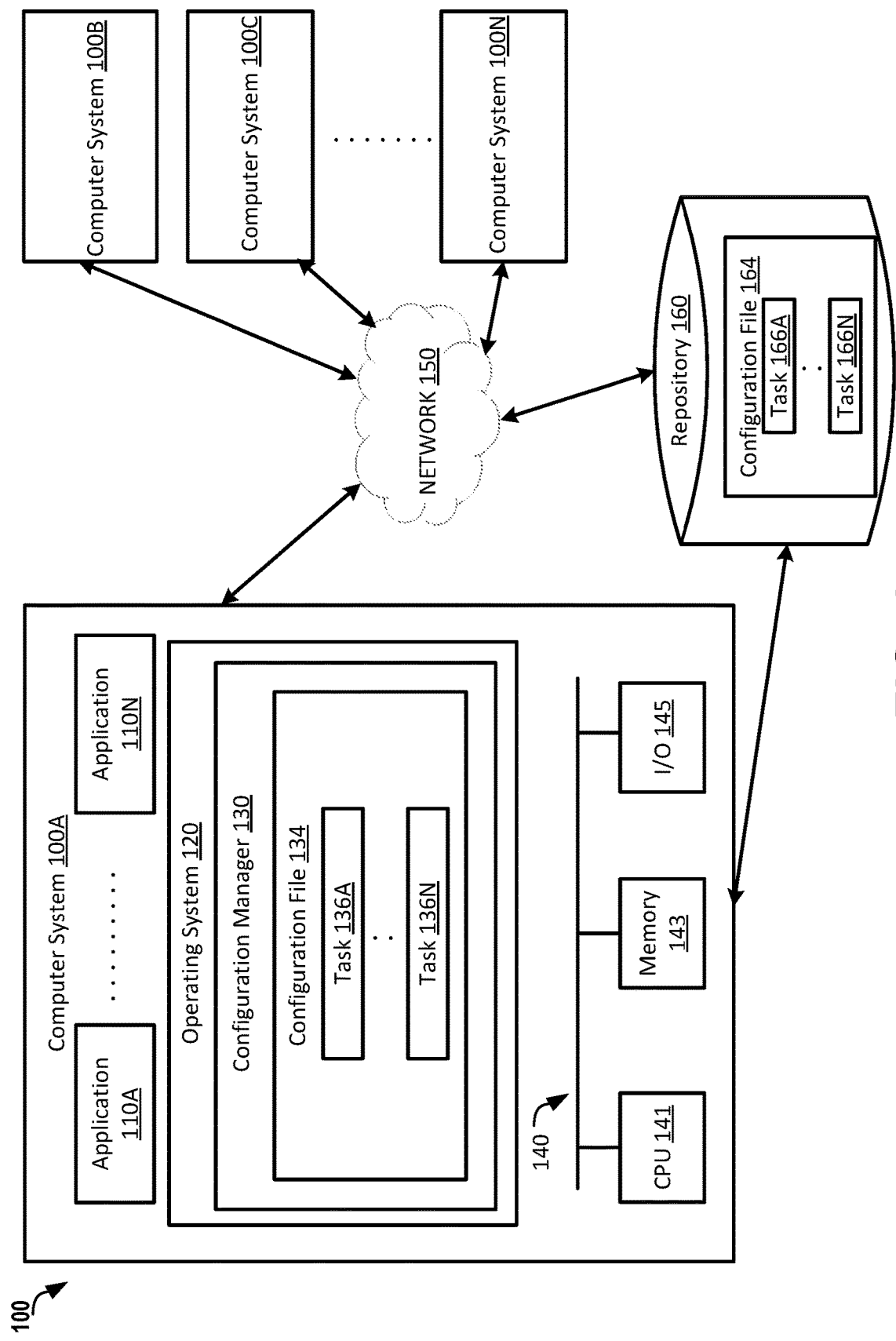
FIG. 1 depicts a high-level block diagram of an example computer system architecture, in accordance with one or more implementations of the disclosure.

Described herein are methods and systems for editing a configuration file during execution of a configuration process that is controlled by the instructions in the configuration file. A configuration process can set or modify parameters that control various operational aspects of the respective hardware, software, applications, operating systems, and/or virtual machines Configuration processes may be employed to establish, manage, and modify the configurations and their respective parameters of a computer system.

A configuration manager may be employed to establish and modify configurations and configuration parameters of one or more computer systems. A computer system herein shall refer to a system comprising one or more processors, one or more memory devices, and one or more input/output (I/O) interfaces. In one illustrative example, a computer system may be provided by a server running an operating system and multiple applications. Each of those applications, their underlying operating systems, virtual machines, and hardware, may have various configurations and configuration parameters designed to control the operational aspects of the respective application, virtual machines, operating systems, and hardware. Examples of configuration parameters may include hardware configuration parameters, operating system configuration parameters, virtual machine configuration parameters, and application configuration parameters.

A configuration manager may use a configuration file to establish, manage, and change configurations and configuration parameters on one or more computer systems. Such a configuration file may contain instructions for performing a configuration process that sets or modifies configuration parameters on one or more computer systems. The configuration file can control various types of configuration processes that can implement the setting or modification of configurations and configuration parameters on multiple computer systems. The setting or modifying a configuration or a configuration parameter for an element (e.g. application, virtual machine, operating systems, hardware, etc.) of a computer system may be referred to herein as a "configuration action". For example, configuration actions may be performed when one or more servers in a data center may need to be synchronized with the configuration state of another server for a data center wide synchronization. In another example, configuration actions may be performed during an upgrade of computer systems or one or more particular applications where several configuration changes are made to a subset of computer system selected from a group of computer systems within an enterprise setting. In another example, configuration actions may include various configuration modifications being performed, while some configurations are reverted back, on one or more computer systems to troubleshoot a particular issue, or to find the best solution to a problem.

Thus, executing a configuration process referenced in or controlled by the configuration file may involve performing multiple tasks that constitute the configuration process. In some situations the configuration process may be time consuming and may require large amounts of computing resources as the configuration process is executed and its constituent tasks are performed on multiple computer systems. In many cases it may be determined that a change should be made to a configuration process before the execution of the configuration process is complete. For example, during the execution of a configuration process it may be determined that an additional task should be performed, that one of the tasks should not be performed, or that certain configuration parameters in a task within the configuration file were input incorrectly. In this situation, if the configuration process is permitted to be fully executed, the result would include undesirable configurations having been made on the target computer systems which were being configured by the configuration process.

Some approaches to making changes to such a configuration process entail completing the configuration process, editing the configuration file, and then executing the configuration process again based on the edited configuration file. Other approaches involve completely stopping the configuration process, at whatever point that it currently is, and editing the configuration file so that the configuration process can be re-run based on the edits. However, in both of these situations, time, energy, and computing resources are wasted because configurations and tasks that were performed as they should have been with proper configuration parameters are performed again when the edited configuration process is executed anew. Accordingly, such approaches not only take more time and delay the setting or modification of configurations but also increase load and strain on computing resources that are made unavailable for other processes. The detrimental consequences of such approaches are especially evident in cases when most of the configuration process has been completed at the time that it is determined that a change should be made to the configuration process. Such cases entail that a large portion (e.g., large number of tasks) of the configuration process needs to be re-executed after the modifications are made.

Aspects of the disclosure address the above and other deficiencies by providing technology that enables a configuration process to be edited in the middle of its execution (i.e., enables a live edit of a configuration process execution). In accordance with one or more implementations of the present disclosure, a configuration process can be paused so that the configuration file that contains the instructions for performing the configuration process can be edited without stopping or restarting the configuration process. After the edits are made, the configuration process can be resumed from the point at which it was paused using the edited configuration file. Accordingly, the configuration process can be completed according to the modifications made to the configuration file without needing to be re-executed from the beginning.

In some implementations, the configuration manager (CM) can be a configuration management application that uses configuration files to execute configuration processes on one or more target computer systems. The CM can be executed on a computer system that manages configurations and may be referred to herein as a control machine. The control machine may use the CM to perform configuration actions on one or more physical or virtual computer systems in accordance with the instructions of the configuration file. The configuration file can include instructions for performing a variety of configuration actions which can be performed in sequence or in parallel (i.e., simultaneously) on one or more computer systems. The instructions of the configuration file may be divided into tasks that are grouped into task groups. Accordingly the tasks contain the instructions for configuration actions that comprise the configuration process. In some implementations the configuration file may be a .yaml file playbook with task groups represented by plays containing one or more tasks. Each play (i.e., task group) may contain instructions for configuration actions that are to be performed on a particular set of target computer systems. Accordingly, the CM may execute different plays (i.e., perform the configuration actions corresponding to the respective tasks within each play) on different sets of target computer systems. Thus, to initiate the execution of a configuration process, a configuration file (e.g., a playbook) can be loaded into the CM so that it can begin performing the configuration actions of the tasks. The CM can execute the tasks sequentially or in parallel on one or more computer systems in accordance with the task groups (e.g., plays) each for which can correspond to a particular set of computer systems.

In some implementations, the CM can be operated by a graphical user interface (GUI) while in others it can be operated by a command line interface (CLI) on the control machine. Each interface enables the user to send commands that are received by the CM and to receive messages and other data from the CM to be viewed. Thus, in some implementations, if it is determined that the configuration process should be modified (i.e., that a change is to be made to the configuration file), an edit initiation command (e.g., a live-edit command) can be entered using the GUI or CLI of the CM to edit the configuration file. Upon receipt of the command, the CM may pause the execution of the configuration process at the point that the command was received. However, if the CM was in the middle of executing a task when the command was received, it may complete the execution of the task and pause the execution of the configuration process immediately thereafter without beginning to execute the next task in the process. In some implementations, the CM can display a message on the GUI or CLI where the configuration file was being executed and indicate that the execution of the configuration process is paused and that the configuration file is open for editing.

The CM can continuously record the state of the configuration process (e.g., progress state of the execution of the configuration process). Accordingly, the CM can record the progress state at the time that the execution was paused as data or metadata associated with the configuration file in a data store. In some implementations, the record of the progress state can be made within the configuration file. The record of the progress state can include an indication of all of the tasks that have been completed, an indication of the last task that has been completed, and/or an indication of the next task that was to be executed at the time that the execution of the configuration process was paused.

In some implementations, the configuration process can be changed by modifying the configuration file. Thus, if the configuration process is running and its progress is being monitored in one user interface of the CM, the configuration file can be opened to be edited in another interface of the CM. Editing the configuration file can include adding tasks, removing tasks, changing the order of the tasks, modifying one or more tasks, as well as changing the tasks groupings. For example, in some implementations, editing the configuration file can include making changes the tasks in one or more plays of a play book.

Upon completing the modifications, an edit completion command (e.g., :wq, shift+zz) can be entered using the GUI or CLI of the CM to end the editing of the configuration file. In some implementations, upon receipt of the edit completion command, the CM can check the configuration file to determine whether any modifications were made and determine whether any changes need to be implemented in the configuration process. For example, the content of the configuration file after editing can be compared with the content of the file immediately prior to the initiation of editing. The CM can also check whether as a result of the modifications to the configuration file any rule violations were introduced (e.g., spelling or syntax errors). If violations (i.e., errors) are found the CM can display a message via the GUI or CLI concerning the violation (e.g., a message indicating that an error exists or prompting a user to make corrections). In some implementations, the CM will not permit the editing of the configuration to be completed until the violations are remedied. When the editing is completed, the modified content of the configuration file can be saved in a data store and/or loaded into the CM. The modified content of the configuration file can replace original content of the configuration file that the CM was using to execute the configuration process.

Accordingly, the modified content of the configuration file can be used by the CM to resume the execution of the configuration process. The CM can reference the record of the state (e.g., progress state of the execution of the configuration process) to resume the execution of the configuration process from the point at which it was paused. For example, the CM can begin executing the task that follows that last task that was completed according to the record of the state. The CM can then complete the execution of the remaining tasks in the configuration process in accordance with the modified content of the configuration file.

In this manner, a configuration process can be modified while it is being executed without needing to restart the execution of the entire configuration process. The various implementations of the present disclosure enable modifications to be made to constituent tasks of a configuration file that controls the execution of the configuration process while removing the need to re-execute the tasks that have already been completed. These implementations can reduce the time needed to implement various configuration processes and reduces the total amount of computing resources used to execute configuration processes that need to be edited after their execution has already been started. Accordingly, this enables more flexibility in designing the configuration processes and respective configuration file since it becomes possible to edit them without needing to re-run the entire process. Overall, the implementations of the present disclosure can reduce computing resources consumed by resource intensive processes, improving performance and accuracy of computing systems. These and other features of the implementations can be better understood with reference to FIGS. 1-6 described below. To provide context for the various implementations and the determination of a distributed system topology for application component deployment, an example network architecture is initially described below.

FIG. 1 illustrates a computer system 100 in which embodiments may operate. It should be noted that other architectures for computer system 100 (also referred to herein as system 100) are possible, and that the implementation of a computer system utilizing embodiments of the disclosure are not necessarily limited to the specific architecture depicted by FIG. 1. Terms such as "machine," "device," "computer," "computer system," and "computing system" may be used interchangeably and synonymously throughout this document.

Computer system 100 can include a single computer system or multiple computer systems arranged in a heterogeneous or homogenous group (e.g., cluster). Computer system 100 can include one or more computer systems, such as computer systems 100A, 100B, 100C, through 100N in accordance with one or more implementations of the present disclosure. Computer system 100 may include computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable editing a configuration process during its execution through the embodiments discussed herein. Computer system 100 may include one or more virtual machines and one or more hypervisors. In some implementations, the computer systems 100A-N can be located in a single physical location (e.g., data center) or can be distributed across multiple different locations (e.g., in different offices).

Each of the computer systems 100A-N may include communicably interconnected hardware components 140 such as a central processing unit (CPU) 141, memory 143, and input/output interfaces (I/O) 145. These hardware components 140 may provide hardware functionality for performing computing tasks. Computer system 100 may include additional or different components, devices, and/or connectors in some implementations of the disclosure.

One or more processors may be embodied as central processing unit (CPU) 141, which can be a micro-processor, digital signal processor (DSP), or other processing component. CPU 141 may process various received data and may carry out the code or instructions or one or more computer programs, for example, to provide input/output operations specified by the instructions. CPU 141 may include one or more processors that are capable of executing the computing tasks described in the present disclosure. CPU 141 may be a single core processor that is capable of executing one instruction at a time (e.g., single pipeline of instructions) or may be a multi-core processor that simultaneously executes multiple instructions. The instructions may encode arithmetic, logical, or I/O operations (e.g., edit initiation and initiation commands received via I/O 145). In one example, CPU 141 may be implemented as a single integrated circuit, two or more integrated circuits, or may be a component of a multi-chip module (e.g., in which individual microprocessor dies are included in a single integrated circuit package and hence share a single socket).

Memory 143 may include volatile memory devices (e.g., random access memory (RAM)), non-volatile memory devices (e.g., flash memory), ROM (read-only memory), EEPROM (electrically erasable programmable read-only memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.).

I/O 145 may be and/or include a device capable of providing an interface between a processor and an external device capable of inputting and/or outputting binary data. In some implementations, I/O 145 also include the GUI and/or the CLI of the CM.

Computer system 100 may include one or more repositories 160. Repository 160 may be a persistent storage that is capable of storing configuration files 164, tasks 166A-166N, etc. Repository 160 may be hosted by one or more storage devices, such as main memory, magnetic or optical storage based disks, tapes or hard drives, NAS, SAN, and so forth. Although depicted as separate from the computer system 100A-100N, in an implementation, the one or more repository 160 may be part of one or more of the computer systems 100A-100N. For example, repository 106 may be a data store of memory 143. In some implementations, repository 160 may be a network-attached file server, while in other embodiments repository 160 may be some other type of persistent storage such as an object-oriented database, a relational database, a non-relational database, and so forth, that may be hosted by a server machine or one or more different machines coupled to the repository 160 via the network 150.

In some implementations, computer system 100 may be connected to a network 150, which may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Computer systems 100A through 100N may be interconnected via network 150.

CPU 141 may execute an operating system (OS) 120, as well as sub-programs and/or applications of OS 120 to provide various features and embodiments described herein. OS 120 may support one or more applications 110 residing on the computer system 100. Applications 110 may include, for example, user application processes, virtual machines, containers and the like. Applications 110 may receive data through network 150. OS 120 may provide an abstraction layer for the resources (especially CPU 141, memory 143 and I/O devices 145) that applications 110 may control to perform their function. OS 120 can make these resources available to applications 110 through inter-process communication mechanisms and system calls. There may be various configurations and respective configuration parameters associated with applications 110, OS 120, as well as with computer systems 100A-100N and their respective hardware and software components (e.g., applications, operating systems, virtual machines, hardware devices).

Implementations of the disclosure provide for editing of a configuration process that is being executed. In one example, OS 120 may include a configuration manager 130 (e.g., Ansible®, Puppet®, Chef®, SaltStack® etc.). Configuration manager 130 may be included in one or more of the computer systems 100A-100N. For example, computer system 100A may include configuration manager 130 and may be designated as the control machine. In one example, configuration manager 130 may only be included in the control machine and not on the other computer systems (e.g., target computer systems). In some implementations, configuration manager 130 (e.g., Ansible®) may have permission to connect (e.g., SSH access), read and/or execute tasks any machine or computer system. In some implementations, CM 139 can have such permissions only for other machines in the system 100 (e.g., 100B-100N) that are not designated as control machines. In other implementations, configuration manager 130 (e.g., Puppet®) may be included in the control machine 110A (e.g., "master") and also in the target machines 100B-100N (e.g., "agent") for a master-agent communication.

In some implementations, CM 130 can load configuration file 134 that can contain instructions for performing a configuration process on one or more computer systems 100A-100N. The configuration file 134 can include one or more tasks 136A-136N that are to be performed as part of the communication process and may each correspond to one or more configuration actions. Various versions and copies of configuration files 163 may be saved and stored in repository 160 as well as loaded for use by CM 130.

In some implementations, CM 130 can receive a command and initiate a configuration process using configuration file 134. The configuration file 134 can include task groups each of which include a set (e.g., a sequence) of tasks that make up the configuration process. For example, the configuration file 134 can include instructions for the performance of sequence of configuration process tasks 136 on one or more computer systems (e.g., each remote computer system 100B-100N).

During the execution of the configuration process, CM 130 can receive (e.g., via I/O 145) a command (e.g., an edit initiation command) instructing the CM 130 running on CPU 141 to edit the configuration file 134. In response to receiving the command (e.g., edit initiation command), the CM 130 can pause the execution of the configuration process. In some implementations, the CM can pause the configuration process at the point in the process at which the command was received. In other implementations, upon receipt of the command, before pausing the configuration process, the CM 130 can complete executing the task (e.g., a task of a play in a playbook) that was being executed when the command was received. In these implementations the CM 130 can pause the execution of the configuration process after completing whichever task was being executed when it received the command.

In some implementations CM 130 can continuously monitor and record the state of the configuration process (e.g., progress state of the execution of the configuration process). In other implementations, CM 130 can record a state of the configuration process (e.g., progress state of the execution of the configuration process) when the execution of the configuration process is paused. The state can be recorded in the configuration file, in another file, or as metadata associated with the configuration file, each of which can be recorded in memory 143 or repository 160. In some implementations the state can indicate all of the tasks of the sequence of tasks of the configuration process that have been completed; the last completed task of the sequence of tasks; and/or the next task that is to be executed in the sequence of tasks of the configuration process.

Via one or more user interactions through I/O 145, CM 130 can open for editing the configuration file containing the instructions of the configuration process that is being executed. For example, while the state of the configuration process (e.g., progress state of the execution of the configuration process) is being monitored in one GUI or CLI of CM 130, the configuration file can be opened for editing in another GUI or CLI of CM 130. Via one or more user interactions through I/O 145, CM 130 can make changes to the configuration file (e.g., modify one or more tasks in the sequence of tasks referenced in the configuration file) by modifying the content of the configuration file and/or generating a modified configuration file. For example, CM 130 can modify the configuration file by adding, removing, or editing at least one of the one or more tasks as well as by changing their order or grouping within task groups. In some implementations the CM 130 can check whether the edits resulted in content that is different from the original content of the configuration file and check the modified content of the configuration file for errors (e.g., spelling and/or syntax errors).

In some implementations, the CM 130 can save the configuration file 164 with its changes (e.g., its modified contents) and store it in repository 164. The CM 130 can load configuration file 164 with modified content and replace the original content of the configuration file 134 with the modified content of the configuration file 164. By referencing the record of the state (e.g., progress state of the execution of the configuration process), the CM 130 can resume the execution of the configuration process using the configuration file with the modified content from the point at which the execution was paused. For example, the CM 130 can determine the last task that was executed (e.g., as indicated in the state record) and initiate the execution of the next task in the configuration process. In this manner, the CM 130 can complete the execution of the configuration process that was edited while it was being executed by executing the remaining tasks (i.e., performing the configuration actions associated with the remaining tasks of the configuration process).

In some embodiments, the CM 130 can be a combination of software and hardware components. For example, CM 130 can include one or more components described in connection with FIG. 6 and can implement one or more methods described in connection with FIGS. 2-3. While various implementations are described in terms of the environment described above, the functionality may be implemented in a variety of other environments including a single, monolithic computer system, as well as various other combinations of virtual machines, computer systems or similar devices connected in various ways. For example, the CM 130 may be running on a virtual machine of computer system 100A, and may execute a configuration process on a group of virtual and or physical machines on computer systems 100B-100N. In some implementations, the CM 130 may include more components than those that are shown and may operate in conjunction with other CMs 130 of computing system 100.

Figure 2:
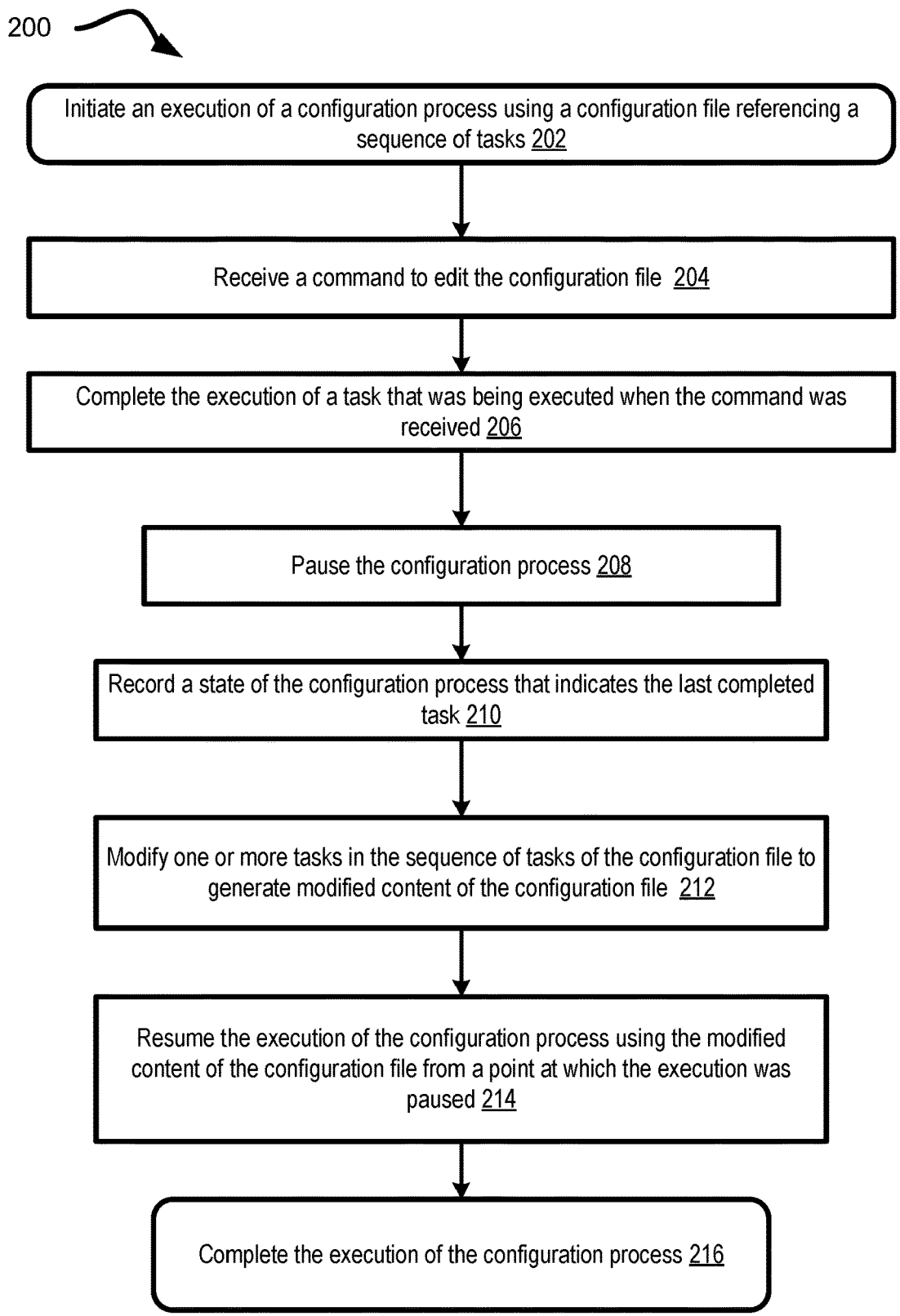
FIG. 2 depicts a flow diagram of an example method for editing a configuration file during the execution of a configuration process, in accordance with some implementations.
Figure 3:
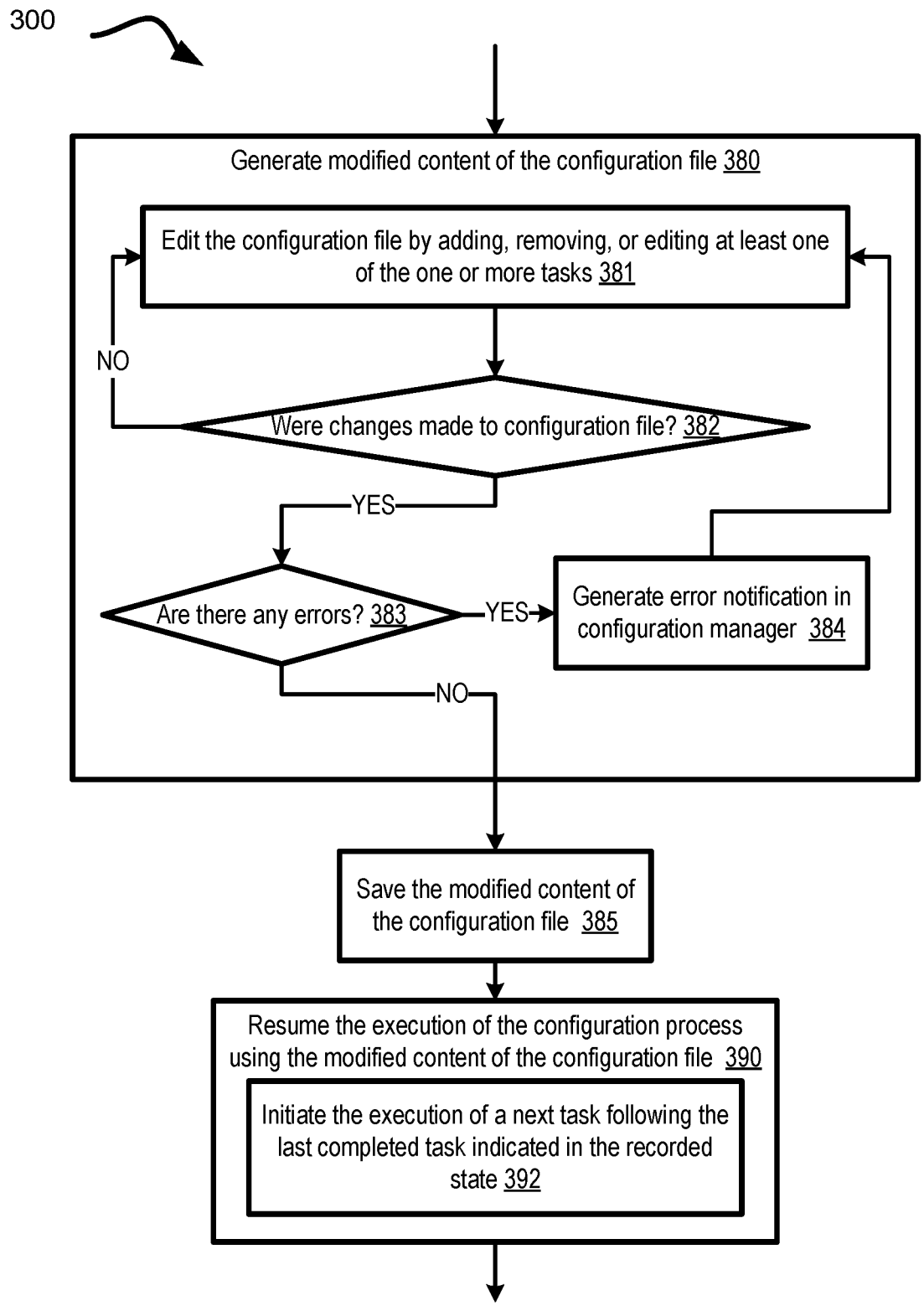
FIG. 3 depicts a flow diagram of an example method for editing a configuration file during the execution of a configuration process, in accordance with some implementations.
Figure 4:
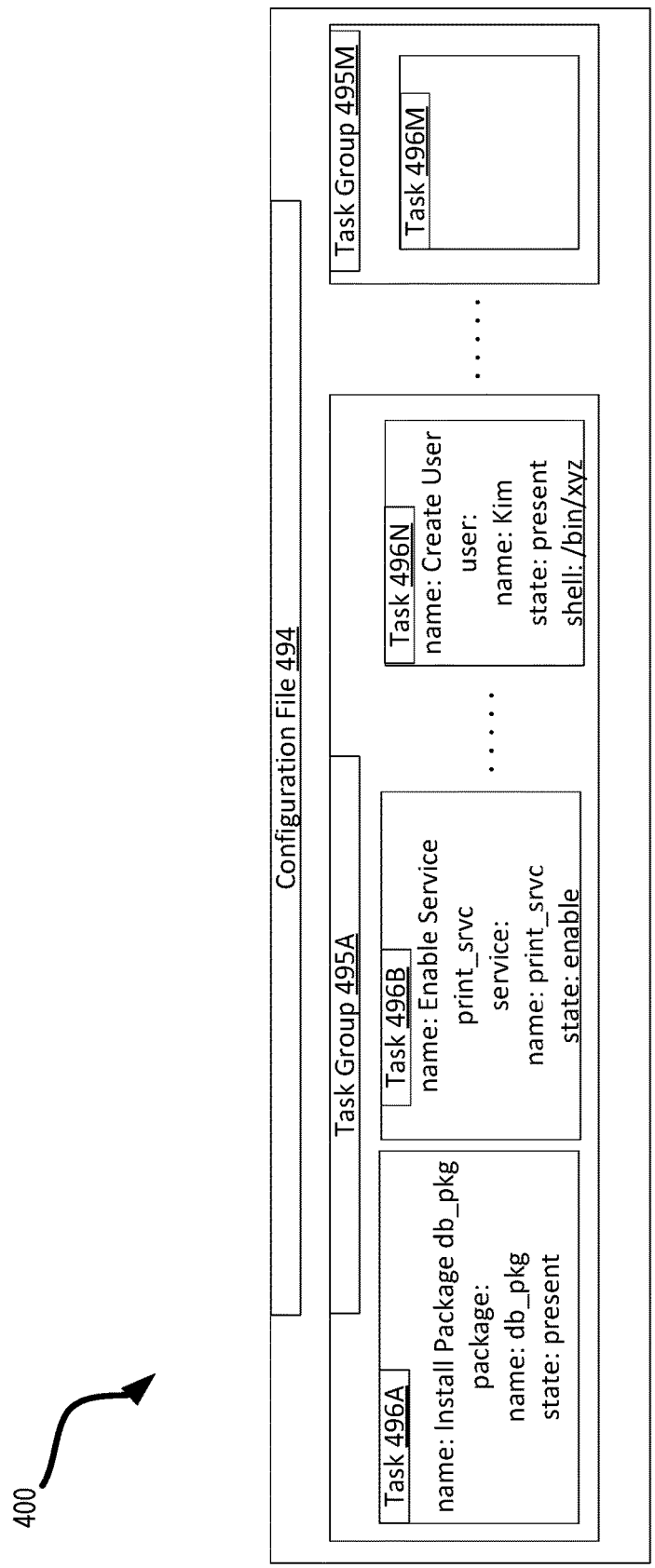
FIG. 4 illustrates a block diagram of an example file of a configuration process, in accordance with some implementations.

The procedures for editing a configuration file controlling a configuration process is described with reference to FIGS. 2-3. FIG. 2 depicts a flow diagram of an example method 200 for editing the configuration file during the execution of its corresponding configuration process, in accordance with some implementations. FIG. 3 depicts a flow diagram of an example method 300 for editing the configuration file during the execution of its corresponding configuration process, in accordance with some implementations. The methods 200 and 300 may be performed by processing logic that may comprise hardware (circuitry, dedicated logic, etc.), software (e.g., executable code executed by a general purpose computer system or a dedicated machine), or a combination of both. Methods 300 and 400 and each of their individual functions, routines, subroutines, or operations may be performed by one or more processors of the computer device executing the method. In certain implementations, methods 200 and 300 may each be performed by a single processing thread. Alternatively, methods 200 and 300 may be performed by two or more processing threads, each thread executing one or more individual functions, routines, subroutines, or operations of the method. In an illustrative example, the processing threads implementing methods 200 and 300 may be synchronized (e.g., using semaphores, critical sections, and/or other thread synchronization mechanisms). Alternatively, the processes implementing methods 200 and 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. It should be understood that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. As used herein, the term "article of manufacture," is intended to encompass a computer program accessible from any computer-readable device or memory page media. In alternative implementations, some or all of the parts of the methods 200 and 300 may be performed by some or all of the components of computing system 100, computer system 500, or device 600. It should be noted that blocks depicted in FIGS. 2-3 can be performed simultaneously or in a different order than that depicted.

In some implementations, at block 202, the processing logic can initiate an execution of a configuration process using a configuration file referencing a sequence of tasks. The processing logic can load the configuration file and execute the configuration process in accordance with the instructions in the configuration file. The configuration file can include one or more tasks that the processing logic can perform which correspond to configuration actions that form part of the configuration process. The configuration process may include the processing logic executing one or more tasks included in the configuration file on one or more computer systems.

While the processing logic is executing the configuration process initiated at block 202, the processing logic can, at block 204, receive a command (e.g., an edit initiation command) to edit the configuration file. In some implementations, the command can cause the processing logic to open the configuration file for editing. In response to receiving the command, the processing logic can, at block 208, pause the execution of the configuration process at the point in the progress of executing the configuration process that it received the command. Additionally, in some implementations, at block 206, the processing logic can complete the execution of a task that was being executed when the command was received (i.e., permit the execution of the task to finish) before pausing the configuration process.

In some implementations, at block 210, the processing logic can record a state of the configuration process (e.g., progress state of the execution of the configuration process) that indicates the last completed task. In other implementations the processing logic can continuously monitor and record a state of the configuration process. In other implementations, the processing logic can, at block 210, record a state of the configuration process when the execution of the configuration process is paused. The processing logic can record the state (e.g., progress state of the execution of the configuration process) in the configuration file, in another file, or as metadata associated with the configuration file, and store it in a data store. The processing logic can include a task completion indicator that indicates (i) all of the tasks of the sequence of tasks of the configuration process that have been completed; (ii) the last completed task of the sequence of tasks; (iii) and/or the next task that is to be executed in the sequence of tasks of the configuration process in the record of the state. The processing logic can then refer to the record of the state and the included task completion indicator at a later time.

In some implementations, at block 212, the processing logic can modify one or more tasks in the sequence of tasks referenced in the configuration file to change the content of (e.g., generate modified content of) the configuration file. Having modified the content of the configuration file, at block 212, the processing logic can, at block 214, resume the execution of the configuration process using the modified content of the configuration file from the point at which the execution was paused. Thus, at block 216, the processing logic can complete the execution of the configuration process based on the modified content of the configuration file (i.e., by completing the execution of the remaining tasks in the configuration file in accordance with the modified content).

The editing, by the processing logic, of the configuration file and generation of the modified content in the configuration file, at block 212, as well as the resumption, at block 214, of the execution of the configuration process are described more in depth below. Thus a more detailed description of the operations involved in changing the content of (e.g., generating the modified content of) the configuration file and resuming the execution of the configuration process with reference to method 300 of FIG. 3.

Accordingly, in some implementations, the modification of tasks and editing of the configuration file, at block 212, can result in the processing logic changing the content of (e.g., generating modified content of) the configuration file, at block 380. The generation of the modified content of the configuration file by the processing logic, at block 380, can include the processing logic, at block 381, editing the configuration file by adding, removing, or editing at least one of tasks (e.g., by changing the parameters of the configuration actions governed by the instructions of the task) or by changing the order or grouping of the tasks within the task groups of the configuration file (e.g., by changing the order of tasks within a play of a playbook or regrouping tasks into different playbooks). In some implementations, the processing logic, at block 381, can edit the configuration file in response to receiving user input to make modifications to one or more tasks.

Then, at block 382, the processing logic can determine whether any changes were made to configuration file. In some implementations, to determine whether changes were made to the configuration file, the processing logic can compare the content of the configuration file that is being edited with the content of the file present immediately prior to the initiation of editing. For example, edits could have been made and reverted or the combination of the modifications made at block 381 may have resulted in the contents of the configuration file after editing being identical to the contents of the modification file before editing started. In this case the processing logic can determine that no changes were made and not proceed further until edits are made at block 381 that modify the configuration files in a manner that results in the content of the configuration file after editing being different from the content of the configuration file before editing.

In some implementations, at block 383, the processing logic can further determine whether there are any errors in the configuration file after the edits have been made. To make this determination, the processing logic can check whether the configuration file has any violations (e.g., spelling or syntax errors) that may have been caused by the modifications made in block 381. If the processing logic determines at block 383 that a violation has occurred (i.e., that an error exists), the processing logic can, at block 384, generate an error notification. For example the processing logic can display an error message in the configuration manager or present a prompt to the user to correct the error (i.e., remedy the violation). The processing logic can prevent the editing of the configuration file from being completed (i.e., require that the configuration file remain open for editing) until the error(s) are corrected/remedied. If the processing logic determines, at block 383, that there are no violations/errors, it can, at block 385, proceed to save the configuration file with the modified content. To save the modified content of the configuration file, the processing logic can, at block 385, store the configuration file with the modified content in a data store and/or load it into a configuration manager. At block 385, by loading the modified content of the configuration file into the configuration manager the processing logic also replace the original content of the configuration file with the modified content of the configuration file.

Thus, in some implementations, at block 390 which corresponds to block 214 of method 200, the processing logic can resume the execution of the configuration process using the modified content of the configuration file. Resuming the execution of the configuration process by the processing logic can include the processing logic initiating, at block 392, the execution of a next task following the last completed task indicated in the recorded state (e.g., progress state of the execution of the configuration process). For example, the processing logic can reference the recorded state to determine the last task that was completed out of the sequence of tasks in the configuration file and begin executing the immediately subsequent task. Thereafter the processing logic can complete the execution of the configuration process, at block 216 of method 200.

In the various implementations described herein the configuration file can take different forms and have task included within it coded in a variety of ways. One such example is provided in FIG. 4 which depicts a block diagram of an example file of a configuration process (i.e., a configuration file), in accordance with some implementations of the present disclosure. In some implementations, CM 130 uses configuration files to execute configuration processes. To control the execution of configuration actions of the configuration process, the configuration file 494 may have multiple tasks 496A-496N (each of which can correspond to one or more configuration actions) be grouped together into task groups 495A-495M. In one example, a CM 130 (e.g., Ansible®) can execute a configuration process based on the tasks 496A-496N (e.g., commands, instructions, executable codes, etc.), that are grouped into plays (i.e., task groups, ordered set of tasks task groups 495A-495M), which are collected to form playbooks (i.e., configuration files 494 containing one or more plays). In an example, each play may comprise tasks related to a certain type of computer system or tasks that target a particular set of computing devices in a computing system architecture. Multiple configuration files (e.g., playbooks) may exist and be used by CM 130, although not depicted in FIG. 3.

Figure 5:
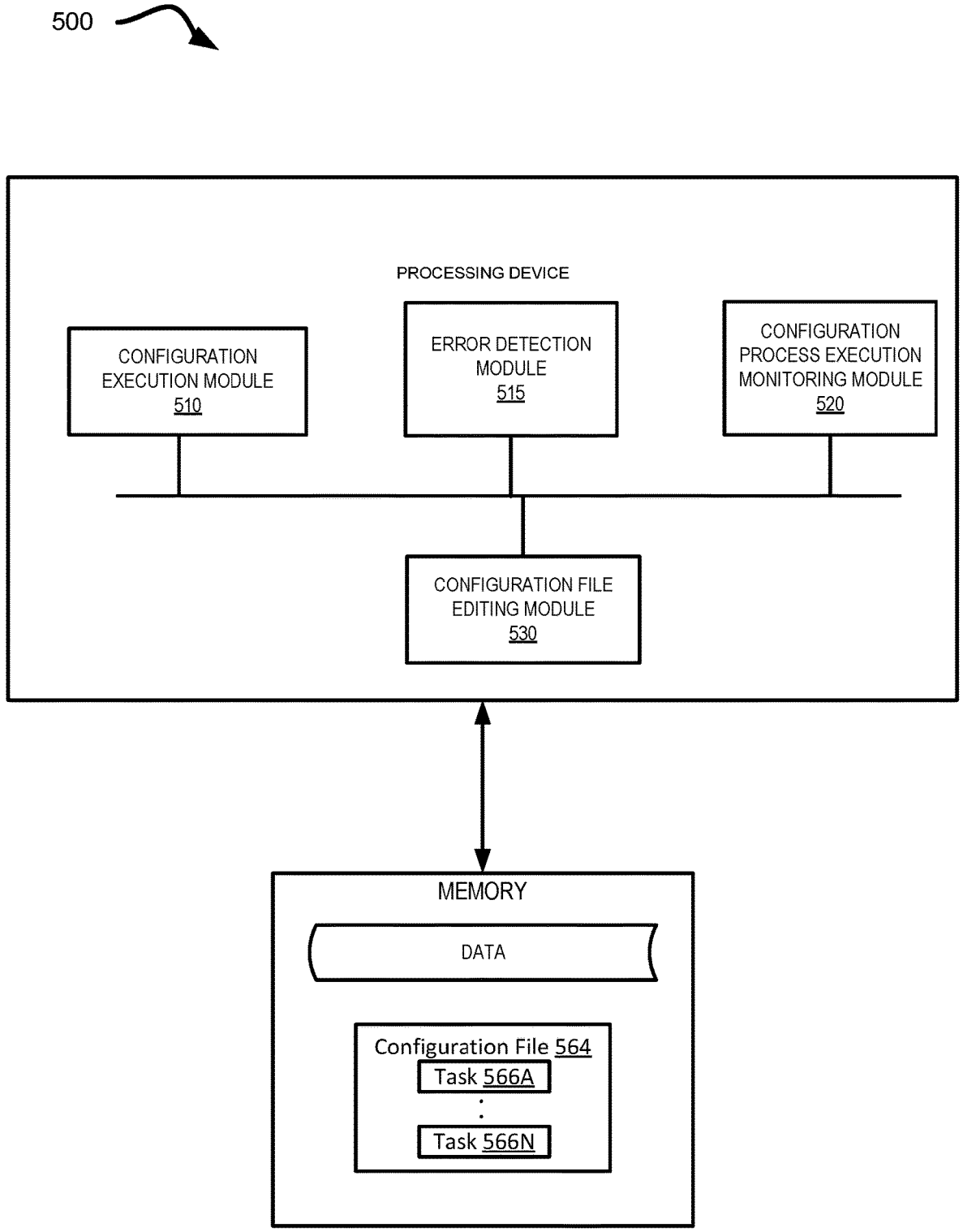
FIG. 5 depicts a block diagram of an example computer system in accordance with one or more implementations of the present disclosure.

FIG. 5 depicts a block diagram of a computer system 500 operating in accordance with one or more aspects of the present disclosure. Computer system 500 may be the same or similar to a computer system 100a-100N of FIG. 1, and may include one or more processing devices and one or more memory devices. In the example shown, computer system 500 may include a configuration execution module 510, an error detection module 515, a configuration process execution state monitoring module 520, and a configuration file editing module 530.

The trace module 510 may enable a processing device to load a configuration file 564 containing instructions for executing a configuration process and to execute the configuration process according to the instructions. The configuration file can be stored in a memory device such as a data store along with other information and can include one or more tasks 566A-566N. The configuration process execution state monitoring module 520 may enable the processing device to monitor and record the progress of the execution of the configuration progress. For example, configuration process execution state monitoring module 520 can enable the processing device to record which of the tasks 566A-566N have been completed as the configuration process is being executed.

The configuration file editing module 530 may enable the processing device to open and edit the configuration file 564. In some implementations, the configuration file editing module 530 can modify the tasks 566A-566N processing device in the configuration file 564. The configuration file editing module 530 can work in conjunction with the error detection module 515 to determine whether any violations are present (e.g., any errors exist) in a configuration file 564 when it is modified/edited before it is saved on the memory device.

Figure 6:
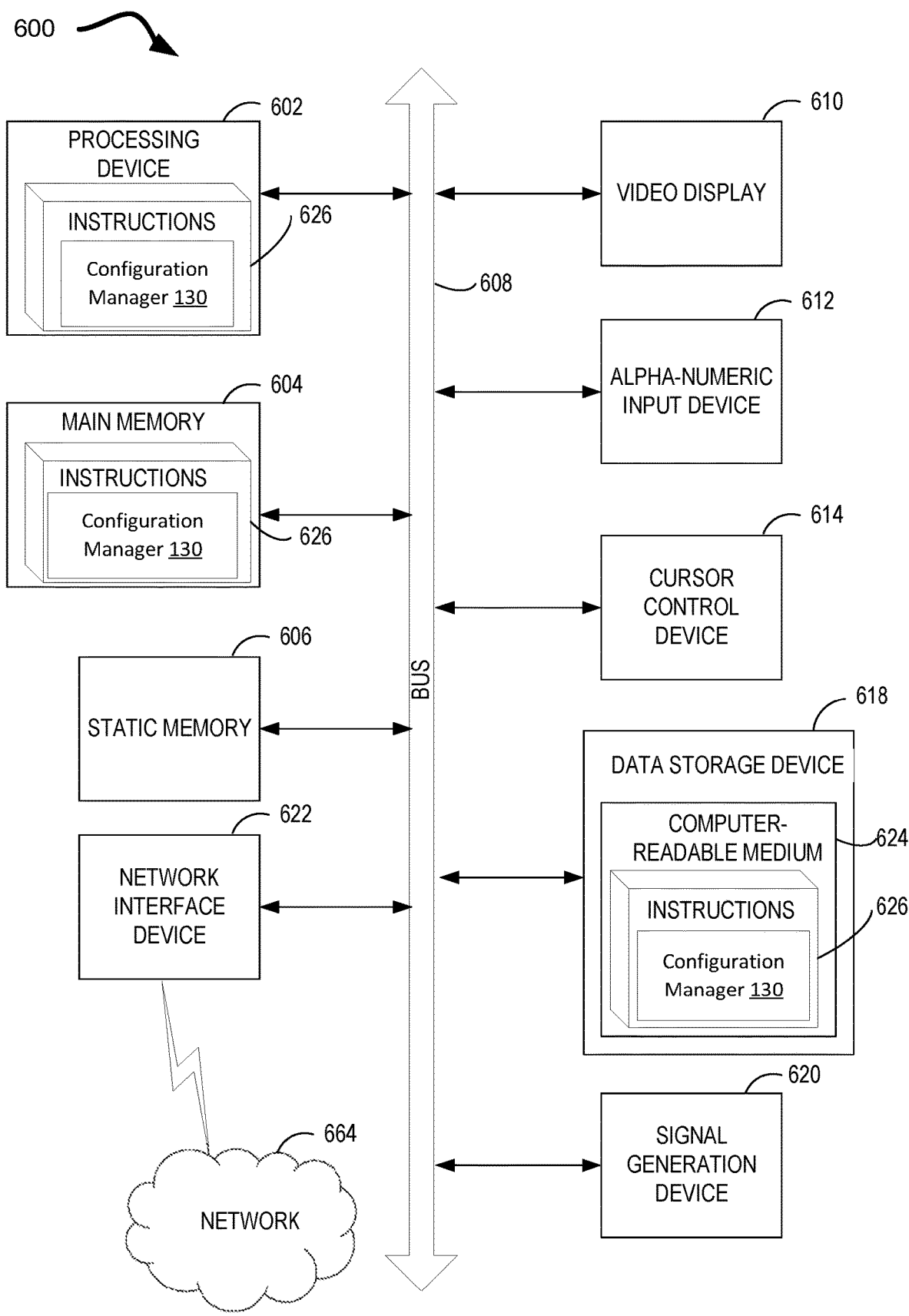
FIG. 6 depicts a block diagram of an illustrative computing device operating in accordance with the implementations of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization and distributed computing. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620. Data storage device 616 may include a non-transitory computer-readable storage medium 624 on which may store instructions 626 encoding any one or more of the methods or functions described herein (e.g., methods 200, 300), including instructions for implementing the configuration manager 130. Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "displaying," "obtaining," "creating," "generating," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   executing, by a processing device, a configuration process using a configuration file referencing a sequence of tasks;
   receiving, via a configuration manager, a command to edit the configuration file;
   responsive to receiving the command, pausing the configuration process;
   modifying one or more tasks in the sequence of tasks to generate modified content of the configuration file; and
   resuming, by the processing device, the configuration process using the modified content of the configuration file.

2. The method of claim 1, further comprising:
   responsive to receiving the command, completing a current task of the sequence of tasks.

3. The method of claim 2, further comprising:
   recording a state of the configuration process before modifying the one or more tasks, wherein the state indicates a last completed task of the sequence of tasks.

4. The method of claim 3, wherein resuming, by the processing device, the configuration process comprises:
   initiating the execution of a next task following the last completed task indicated in the recorded state.

5. The method of claim 1, further comprising:
   saving the modified content of the configuration file and replacing original content of the configuration file in the configuration manager with the modified content of the configuration file before resuming the configuration process.

6. The method of claim 1, wherein the configuration file contains instructions for performing the sequence of tasks on each computer system of a plurality of remote computer systems.

7. The method of claim 1, wherein modifying one or more tasks in the sequence of tasks to generate a modified configuration file comprises:
   editing the configuration file by performing at least one of adding, removing, and editing at least one of the one or more tasks; and
   checking the modified content of the configuration file for errors.

8. A system comprising:
   a memory;
   a processing device coupled to the memory, the processing device configured to:
      initiate an execution of a configuration process using a configuration file referencing a sequence of tasks;
      receive, via a configuration manager, a command to edit the configuration file;
      responsive to receiving the command, pause the configuration process;
      modify one or more tasks in the sequence of tasks to generate modified content of the configuration file; and
      resume the configuration process using the modified content of the configuration file from a point at which the execution was paused.

9. The system of claim 8, wherein the processing device is further configured to:
   responsive to receiving the command, complete a current task of the sequence of tasks.

10. The system of claim 9, wherein the processing device is further configured to:

record a state of the configuration process before modifying the one or more tasks, wherein the state indicates a last completed task of the sequence of tasks.

11. The system of claim 10, wherein resuming the configuration process comprises:
  initiating the execution of a next task following the last completed task indicated in the recorded state.

12. The system of claim 8, wherein the processing device is further configured to:
  save the modified content of the configuration file and replace original content of the configuration file in the configuration manager with the modified content of the configuration file before resuming the configuration process.

13. The system of claim 9, wherein the configuration file contains instructions for performing the sequence of tasks on each computer system of a plurality of remote computer systems.

14. The system of claim 8, wherein the processing device is further configured to:
  edit the configuration file by adding, removing, or editing at least one of the one or more tasks; and
  check the modified content of the configuration file for errors.

15. A non-transitory machine-readable storage medium including instructions that, when accessed by a processing device, cause the processing device to:
  initiate an execution of a configuration process using a configuration file referencing a sequence of tasks;
  receive, via a configuration manager, a command instructing to edit the configuration file;
  responsive to receiving the command, pause the configuration process;
  modify one or more tasks in the sequence of tasks to generate modified content of the configuration file; and
  resume the configuration process using the modified content of the configuration file from a point at which the execution was paused.

16. The non-transitory machine-readable storage medium of claim 15, wherein the instructions further cause the processing device to:
  responsive to receiving the command, complete a current task of the sequence of tasks.

17. The non-transitory machine-readable storage medium of claim 16, wherein the instructions further cause the processing device to:
  record a state of the configuration process before modifying the one or more tasks, wherein the state indicates a last completed task of the sequence of tasks.

18. The non-transitory machine-readable storage medium of claim 17, wherein resuming the configuration process comprises:
  initiating the execution of a next task following the last completed task indicated in the recorded state.

19. The non-transitory machine-readable storage medium of claim 15, wherein the instructions further cause the processing device to:
  save the modified content of the configuration file and replace the configuration file in the configuration manager with the modified content of the configuration file before resuming the configuration process.

20. The non-transitory machine-readable storage medium of claim 15, wherein the instructions further cause the processing device to:
  edit the configuration file by adding, removing, or editing at least one of the one or more tasks; and
  check the modified content of the configuration file for errors.

* * * * *